United States Patent [19]
Nelimarkka

[11] 4,058,290
[45] Nov. 15, 1977

[54] GATE VALVE

[75] Inventor: Juha Antti Elia Nelimarkka, Helsinki, Finland

[73] Assignee: Neles Oy, Helsinki, Finland

[21] Appl. No.: 671,492

[22] Filed: Mar. 29, 1976

[30] Foreign Application Priority Data

Apr. 15, 1975 Finland .................................. 751116

[51] Int. Cl.² ................................................ F16K 1/22
[52] U.S. Cl. .................................................... 251/306
[58] Field of Search ................................ 251/305, 306

[56] References Cited

U.S. PATENT DOCUMENTS

| 1,152,176 | 8/1915 | Hennebohle | 251/305 |
| 1,167,145 | 1/1916 | Baverey | 251/305 |
| 2,789,785 | 4/1957 | Woods | 251/306 |
| 2,835,268 | 5/1958 | Dillberg et al. | 251/305 |
| 3,877,678 | 4/1975 | Jung | 251/305 |

FOREIGN PATENT DOCUMENTS

| 213,184 | 8/1956 | Australia | 251/305 |
| 611,354 | 2/1926 | France | 251/305 |
| 1,059,619 | 7/1952 | France | 251/305 |
| 602,739 | 6/1959 | Italy | 251/305 |
| 207,926 | 5/1923 | United Kingdom | 251/305 |
| 753,105 | 12/1954 | United Kingdom | 251/305 |
| 843,845 | 10/1957 | United Kingdom | 251/305 |

*Primary Examiner*—William R. Cline
*Assistant Examiner*—H. Jay Spiegel
*Attorney, Agent, or Firm*—Cushman, Darby & Cushman

[57] ABSTRACT

A gate valve having a cylindrical angle-transported disc gate pivotally moveable into a channel closing position in which it is in sealing engagement with a packing ring disposed in a radial packing groove in a body defining the channel. The outer diameter of the packing ring is smaller than the diameter of the packing groove so that when the gate is pivoted into a channel closing position in sealing engagement with the packing ring, the ring is biased into tight sealing engagement with the gate.

2 Claims, 5 Drawing Figures

GATE VALVE

BACKGROUND AND SUMMARY OF THE INVENTION

The subject of the present invention is a gate valve which comprises a body provided with a flow channel of a circular cross-section form, a cylindrical angle-transported disc gate arranged into said body and pivotable by means of a shaft means, a packing ring placed in a groove between the bottom of an expansion provided in the flow channel and the front face of a support ring extending to the flow opening, the packing ring engaging edge of the gate is a part of a circular cylinder face whose longitudinal axis is not perpendicular to the plane of the gate.

Gate valves are previously known in which the packing ring is freely placed in the valve body in a groove formed into the flow channel either perpendicularly to the flow direction or in an oblique position.

The gate valve in accordance with the invention, however, is mainly characterized in that the outer diameter of the packing ring, preferably a metallic one, is smaller than the diameter of the bottom of the packing groove and that the inner diameter of said packing ring is smaller than the width of the gate in the direction perpendicular to the pivoting-shaft but larger than, or equal to, the height of the gate at the pivoting-shaft; that is, the inside diameter of the annular ring is slightly larger than the diameter of each circular face of the cylindrical angle-transported disc gate. When the valve is being closed, the gate presses the packing ring outwards towards the bottom of the packing groove primarily in the direction of the largest diameter of the gate while, at the same time, forcing the packing to pull itself inwards tightly against the edge face of the gate primarily in the direction of the smallest diameter of the gate so that tight engagement is provided between the packing ring and gate.

BRIEF DESCRIPTION OF THE DRAWINGS

The invention comes out more closely from the following description and from the attached drawing, wherein.

DETAILED DESCRIPTION OF THE INVENTION

The gate valve includes a body 1, which has a circular cross-sectional shape and is provided with a flow opening 3 and in which a pivotable closing unit or gate 2 is arranged by means of a spindle or shaft means 8.

Figure 1:
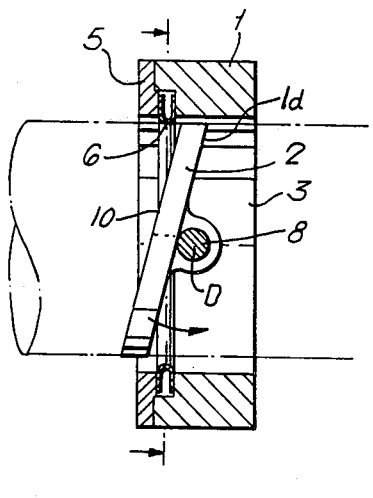
FIG. 1 shows a valve in accordance with the invention as viewed in the direction of the pivoting-shaft and as section at a stage in which the valve is almost closed.
Figure 2:
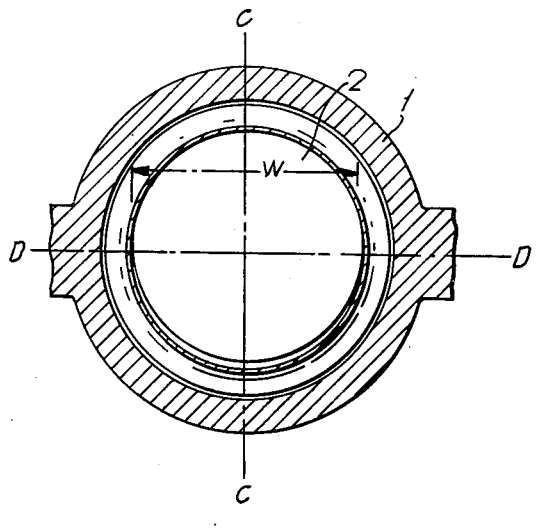
FIG. 2 shows the situation of FIG. 1 as viewed in the direction of the flow channel.
Figure 3:
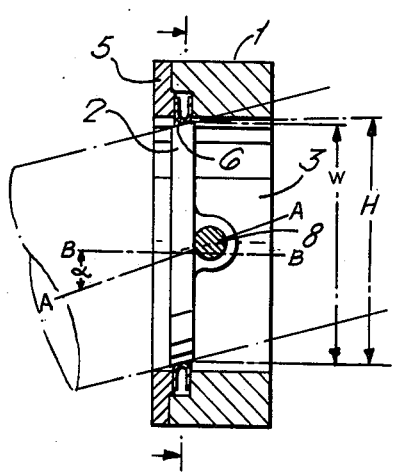
FIGS. 3 and 4 show the valve as closed, corresponding to FIGS. 1 and 2, respectively.

The pivoting-shaft 8 is arranged in the middle of the flow opening 3 and mounted at both ends to the body 1, and the gate 2 is placed on the side of the shaft 8 in the way shown in FIGS. 1 and 3, for rotation about axis D—D of shaft 8. The gate 2 comprises a cylindrical angle-transported disc for engaging a mating surface 9 of the annular valve seat member 6. The gate 2 has a pair of circular faces 10, 10' and is in the form of a cylinder having its longitudinal axis angle-transported; that is, the longitudinal axis A—A of the gate 2 makes an angle α greater than 0° with respect to a line B—B perpendicular to one of the faces 10, 10' (the face 10 in the drawings) and through the center thereof.

In the inner surface of the flow opening 3 of the body 1, beginning from one end of the body, an annular expansion 4 is provided, which expansion extends close to the shaft line of the valve.

Figure 5:
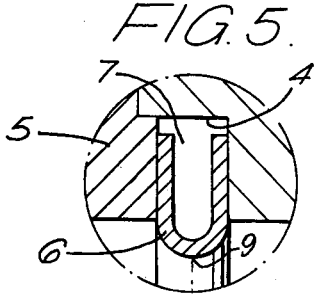
FIG. 5 is an enlarged cross-sectional view of the packing groove and packing ring.

Against the bottom of the expansion 4, a packing ring, or annular valve seat, 6 is arranged, preferably a metallic packing ring, whose cross-sectional form can be, for example, that of U opening towards the bottom of the packing groove 7. The other side wall of the packing groove 7 is provided by a support ring 5, which is placed in the expansion 4 of the flow opening 3 in the way indicated by FIG. 5. The outer diameter of the packing ring 6 is smaller than the diameter of the bottom of the packing groove 7 and the inner diameter of the packing ring smaller than the dimension W of the gate 2 (equal to the diameter of either face 10 or 10' of gate 2) along the pivoting-shaft 8, but larger than, or equal to, the dimension H of the gate 2 along a line C—C perpendicular to the axis of rotation D—D of the gate 2.

Figure 4:
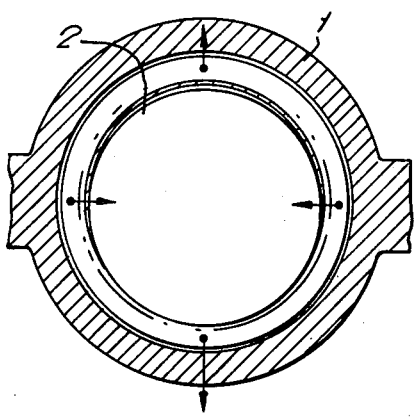

When the valve is being closed, the elliptic gate 2 presses the circular packing 6 from the untightened position shown in FIG. 1 outwards towards the bottom of the packing groove 7 primarily along the line C—C of the gate 2 while, at the same time, forcing the packing 6 to pull itself inwards tightly against the edge face of the gate 2 primarily in the direction of the smallest dimension W of the gate 2 along axis D—D. The flow opening 3 of the valve as tightly closed by the gate 2 is shown by the FIGS. 3 and 4.

The invention is of course not restricted to the embodiment shown in the drawings, but it may show even considerable variability in its details within the scope of the claim.

What I claim is:

1. A valve comprising:
   a body member, a substantially circular bore therethrough, said bore having an axis and fluid being adapted to flow through said bore;
   a metal annular valve seat member;
   means for mounting said annular valve seat member in said bore so that said valve seat member has a mating surface thereof disposed in said substantially circular bore so that said annular valve seat member is radially movable with respect to said circular bore both toward and away from an axis of said bore, said mounting means including a packing groove having a larger diameter than the outside diameter of said annular valve seat member;
   a disc for engaging said mating surface of said annular valve seat member to close off said bore, said disc including a pair of circular offset faces, each of said faces being of the same diameter; said disc being configured such that a first line connecting the centers of said faces forms an acute angle with a second line extending perpendicularly from the center of either of said faces wherein the inside diameter of said annular valve seat member when unstressed is greater than said diameter of said circular disc faces but less than the length of a third line defining the largest dimension of said disc; and
   shaft means for mounting said disc for rotation about an axis of rotation between a closed position and an open position, said axis of rotation being perpendicular to said bore axis and being perpendicular to a plane which includes said bore axis and said third line, said axis of rotation being offset along said bore axis from said disc when said disc is in said closed position; said shaft means being operable to move said disc into contact with said annular valve seat member mating surface to move portions of said annular valve seat member away from said bore axis and to move other portions of said annular valve seat member toward said bore axis so that tight engagement is provided between said annular valve seat member and said disc around the whole periphery of said disc such that the flow of fluid through said bore is closed off.

2. A gate valve as recited in claim 1 wherein said metal annular valve seat member has a U-shaped cross-section, the bottom of the U providing the mating surface for mating with said gate.